Sept. 14, 1954  A. E. BADGER ET AL  2,688,824
METHOD OF PRODUCING MULTIPLE SHEET GLAZING UNITS
Filed April 21, 1953  2 Sheets-Sheet 1
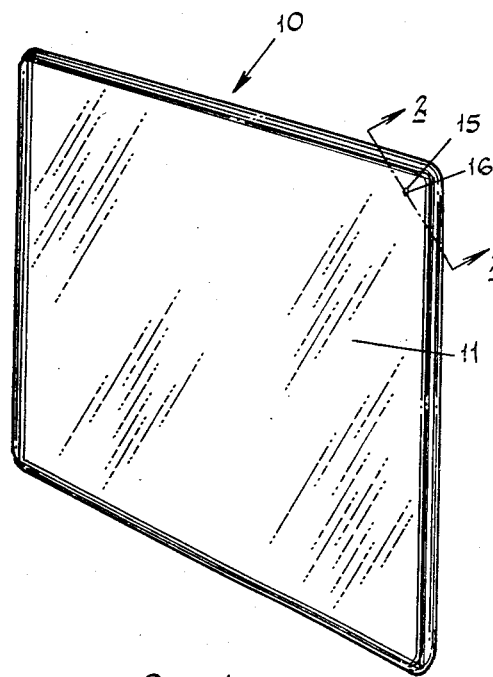
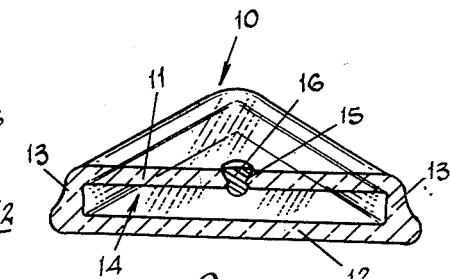
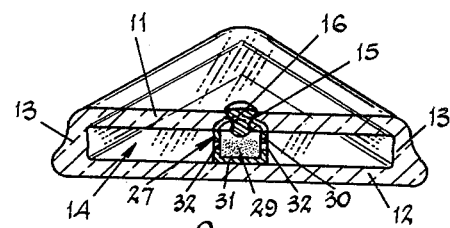
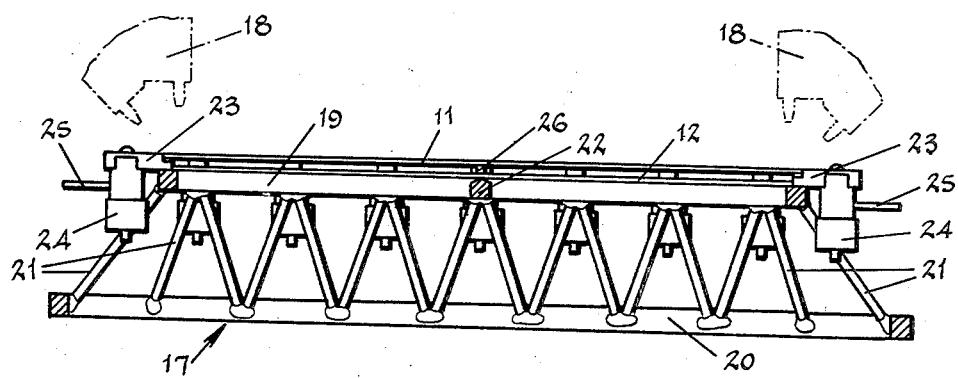
Inventors
Alfred E. Badger,
Warren R. Kowalka and John A. Woods
By
Nobbe & Swope
Attorneys Sept. 14, 1954   A. E. BADGER ET AL   2,688,824
METHOD OF PRODUCING MULTIPLE SHEET GLAZING UNITS
Filed April 21, 1953   2 Sheets-Sheet 2
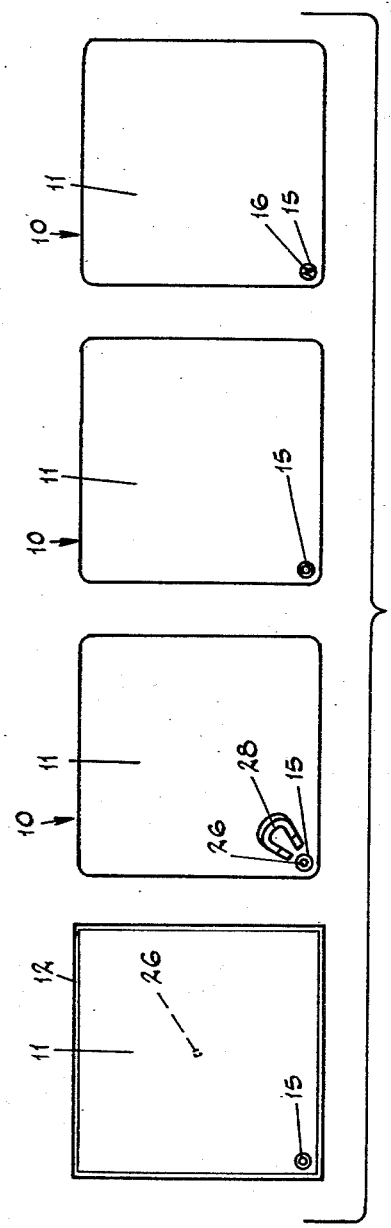
Fig. 6
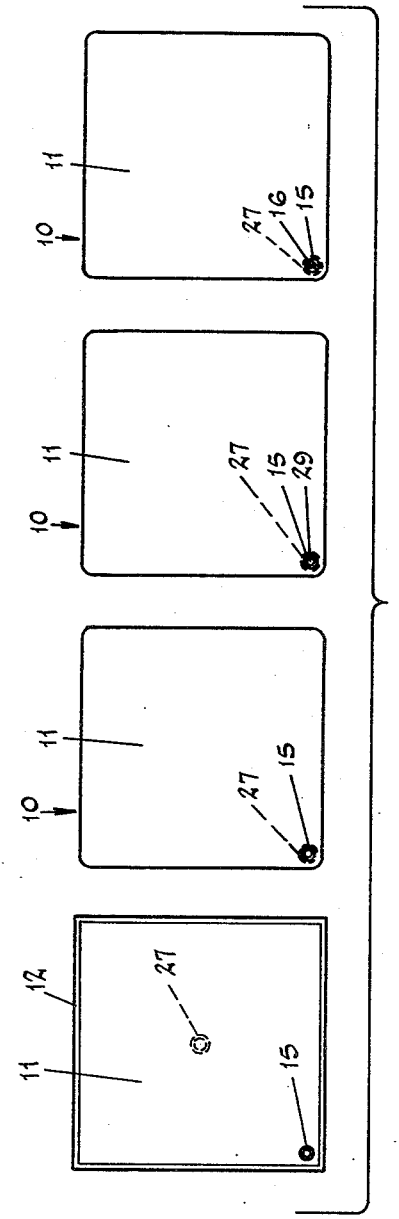
Fig. 7
Fig. 5
Inventors
Alfred E. Badger,
Warren R. Kowalka and John A. Woods
By Nobbe & Swope
Attorneys Patented Sept. 14, 1954

2,688,824

UNITED STATES PATENT OFFICE 2,688,824

METHOD OF PRODUCING MULTIPLE SHEET GLAZING UNITS

Alfred E. Badger, Maumee, and Warren R. Kowalka and John A. Woods, Toledo, Ohio, assignors to Libbey-Owens-Ford Glass Company, Toledo, Ohio, a corporation of Ohio Application April 21, 1953, Serial No. 350,139

12 Claims. (Cl. 49—79)

This invention relates broadly to multiple sheet glazing units. More particularly, it relates to an improved method for producing hermetically sealed multiple sheet glazing units made entirely of glass.

Multiple sheet glazing units may be described generally as comprising two or more spaced sheets of glass which are sealed together entirely around their marginal edge portions to provide an hermetically sealed dead air space therebetween. Due principally to their insulating and condensation preventing qualities, such units have become well established fixtures in the building trades and have found wide usage as windows for buildings, show cases, vehicles, refrigerators, and the like.

It has been proposed to form these units entirely of glass by sealing the marginal edge portions of one sheet directly to those of the other. According to one method of production, more particularly described in a copending application, Serial No. 300,884, filed by John A. Woods et al., and assigned to the assignee of the present application, one sheet of glass is supported at its marginal edge portions in spaced relation above those of another sheet, and the edge portions of both sheets are moved past concentrated heat sources impinging thereon to cause them to be sealed directly together entirely therearound to form an air space therebetween. During this edge sealing operation, the air space may be permitted to "breathe" through a small opening or hole in one of the sheets. After the edges have been sealed, the air space may be dehydrated through the "breather" or dehydration hole, in a manner well known in the art, after which said dehydration hole may be hermetically sealed. As an alternative measure, it has also been proposed to create and maintain a properly dehydrated condition within the air space by placing a suitable desiccant therein prior to sealing the dehydration hole.

However, it is of considerable importance, during the sealing together of the marginal edge portions of the spaced sheets, that said sheets be maintained in fixed spaced relation. That is, a uniform thickness of air space in the finally produced unit not only insures a stronger edge seal between the sheets but also prevents optical distortion of objects viewed therethrough.

It has been found, however, that when one sheet of glass is supported above another at only its marginal edge portions in a manner, for example, similar to that above-mentioned, there is a marked tendency for the central unsupported portion of said upper sheet to sag downwardly under its own weight. This has been found especially true in the case of relatively large sheets of glass and has, in many cases, resulted in considerable non-uniformity of air space between the spaced sheets. At the same time, it will be readily apparent that for commercial purposes the completed units must be optically clear and free from any permanent central supporting means or spacers in the central viewing area thereof.

It is an object of this invention to provide an improved method of producing a multiple sheet glazing unit in the general manner described in which the central unsupported portion of an upper glass sheet is maintained in properly spaced relation to that of a lower sheet during the sealing together of the marginal edge portions thereof.

Another object of this invention is to provide an improved method of producing a multiple sheet glazing unit in the manner above described in which the supporting means for the central portion of the upper sheet may be readily removed from the central viewing area of the unit subsequent to the edge sealing thereof.

Still another object of this invention is to provide an improved method of producing a multiple sheet glazing unit in the manner above described in which the central supporting means may be removed from the air space within the unit subsequent to the edge sealing and prior to dehydrating thereof.

Still another object of this invention is to provide an improved method of producing a multiple sheet glazing unit in the manner described in which a specially constructed central supporting means may be filled with a dehydrating material and permanently located within the air space of the unit subsequent to its removal from the central viewing area thereof.

Other objects and advantages of the invention will become more apparent during the course of the following description when taken in connection with the accompanying drawings.

In the accompanying drawings, wherein like numerals are employed to designate like parts throughout the same:

Fig. 1 is a perspective view of an all-glass, multiple sheet glazing unit produced in accordance with this invention;

Fig. 2 is an enlarged sectional perspective view taken substantially along the line 2—2 of Fig. 1 and showing in detail the hermetically sealed dehydration hole of a multiple sheet glazing unit produced according to one form of this invention;

Fig. 3 is a view similar to Fig. 2 and showing the hermetically sealed dehydration hole and a desiccant cup located adjacent thereto within a multiple sheet glazing unit produced according to another form of this invention;

Fig. 4 is an elevational view of apparatus for supporting the marginal edge portions of one glass sheet in spaced relation above another prior to and during part of the sealing thereof and a supporting means disposed between central portions of said sheets;

Fig. 5 is a detail view of the desiccant cup of Fig. 3 when empty;

Fig. 6 is a schematic view showing sequentially the steps of the form of this invention productive of a multiple sheet glazing unit as shown in Fig. 2; and Fig. 7 is a view similar to Fig. 6 showing the steps of the form of this invention productive of a multiple sheet glazing unit as shown in Fig. 3.

Referring now particularly to these drawings, a multiple sheet glazing unit, produced in accordance with this invention and designated in its entirety by the numeral 10, includes upper and lower sheets of glass 11 and 12, respectively, which are sealed together entirely therearound by side portions 13 to enclose therebetween an air space 14. The side portions 13 are formed from the marginal edge portions of one or both of said sheets which portions may be softened under the influence of heat and caused to be sealed to one another in a manner, for example, as described in detail in the aforementioned copending application of John A. Woods et al. and to be more fully explained hereinafter. A "breather" or dehydration hole 15 is disposed in the upper sheet 11 adjacent a corner or an edge thereof and is hermetically sealed by a plug 16.

The upper sheet of glass 11, with the dehydration hole 15 formed adjacent a corner thereof, is first assembled in properly spaced relation above the lower sheet 12. For the purpose of sealing the unit, both sheets may be supported on a tray 17 (Fig. 4) and moved continuously through a furnace (not shown) so that the marginal edge portions of said sheets may be moved past concentrated heat sources in the form of impinging burners 18 disposed along opposite sides of the furnace, in a manner more fully described in the aforementioned copending application of John A. Woods et al. As explained more fully therein, the tray may be moved through the furnace on a conveyor (not shown) and oriented during said movement to cause all of the marginal edge portions of the unit to be moved past spaced heat sources or burners so that the sheets are edge sealed entirely therearound.

The tray 17 comprises upper and lower rims 19 and 20, respectively, which are connected together by struts 21. The lower rim 20 is adapted to be moved over the aforementioned conveyor and the upper rim 19 is of an outline conforming to the lower glass sheet 12 which is adapted to rest thereon. One or more braces 22 may be extended between opposite rails of the upper rim for supporting the central portion of the lower sheet 12 in a substantially flat position.

The upper sheet 11 is supported in spaced relation above the lower sheet 12 at a number of locations along its marginal edge portions by fingers 23 which are rotatably mounted in bearings sleeves 24 secured to the tray 17 at each side thereof. Each of the fingers 23 is provided with an arm 25 extending outwardly therefrom which is adapted to be "knocked-out" or rotated to an inoperative or unsupporting position as the marginal edge of the upper sheet supported thereby is moved into position to be sealed to that of the lower sheet by impinging flames from the burner 18. Thus, as more fully described in the aforementioned copending application, one or more of the spaced edge portions of the spaced glass sheets are sealed together as the remaining edge portions are held spaced apart by either the fingers 23 or by one or more of the just sealed edge portions.

It can be seen from Fig. 4, however, that especially in the case of relatively large sheets of glass, the central portion of the marginally supported upper sheet 11, if unsupported, would sag downwardly such that the spacing between the sheets would be less at said central portions than at the marginal portions. Of course, the larger the span of the sheets, the greater the problem. According to the present invention, during assembly of the upper and lower sheets 11 and 12 in spaced relation upon a suitable edge supporting means, such as the tray 17, and prior to the edge sealing of the sheets, there is placed between the central portions thereof a supporting means, either in the form of a rod 26 (Fig. 4) or a cup 27 (Fig. 5). In either case, however, the supporting means is of a height corresponding approximately to the spacing between the sheets at the marginally supported edge portions thereof. Thus, as supported on the tray 17, for example, all portions of the glass sheets are uniformly spaced apart prior to the edge sealing thereof.

While for the purpose of simplicity, the central supporting means is shown as either a centrally located rod 26 or cup 27, it will be understood that two or more such members may be used at suitably disposed locations between the sheets. That is, it may be found necessary to support the central portion of the upper sheet 11 at two or more spaced locations in order to bring about a substantially uniform spacing between the sheets. In this respect, it will be further understood that the "central portion" of the glass sheets includes all or any part of said sheets disposed inwardly of the marginally supported edges thereof.

Thus, during the edge sealing of the glass sheets 11 and 12, the space therebetween is maintained uniform such that when the unit is sealed entirely therearound and the edge portions 13 thereof have cooled and set, the air space 14 is substantially uniform throughout. After the tray 17 has been moved through the furnace and the marginally sealed glazing unit moved from said tray to a suitable location, in accordance with the novel method of this invention, the central supporting means, in the form of rod 26 or cup 27, may be removed from the effective or central viewing area of the marginally sealed unit. Of course, in one sense, all portions of the unit may be considered a "viewing area." However, as used herein, the effective or central viewing area includes that area of the completed glazing unit through which objects are normally viewed when said unit is properly mounted in a framing member or the like. That is, the central viewing area is intended to mean that area of the glazing unit which is bordered by or disposed slightly inwardly of the framed portions thereof.

This step of removing the supporting means from the central viewing area may be performed in a number of ways. It has been found especially satisfactory to remove the rod 26 by means of a magnet 28, as shown schematically in the second diagram (left to right) of Fig. 6. In this case, the rod 26 may be of steel or other magnetic material and in slender cylindrical form. The magnet 28 may be placed over the rod 26 in its centrally disposed position of the first diagram and moved over the outside of the unit to a position outside of the central viewing area. In this manner, the rod 26 is drawn from its central supporting position within the air space 14 to a position as determined by the movement of the magnet 28. Alternatively, the unit may be merely tilted so as to cause the supporting means to slide from its central supporting position to the desired position outside of the central viewing area. In this case, of course, the supporting means may be of a non-magnetic ceramic material, such as porcelain, glass, and the like. This particular embodiment of the invention is represented by the second diagram of Fig. 7 in connection with the cup 27.

According to one form of this invention, the supporting means, and particularly the rod 26, may at this time be completely removed from the air space 14 within the unit. The magnet 28 may also be used for this purpose. That is, the rod 26 is of a diameter slightly less than that of dehydration hole 15 such that it may be drawn from its central supporting position to a position outside the viewing area and beneath the dehydration hole 15 and then lifted bodily from within the air space 14 through said hole by the magnet 28 to leave said air space free of said central supporting means, as shown in the third diagram of Fig. 6.

At this time, the unit may be dehydrated and the dehydration hole 15 hermetically sealed by the plug 16, as indicated in the fourth diagram of Fig. 6, so as to maintain said dehydration condition therein. Any well-known methods may be used for this purpose, none of which constitutes a novel practice of the present invention. The hermetically sealed dehydration hole of a multiple sheet glazing unit 10 produced according to this form of the invention is shown in detail in Fig. 2.

According to another form of this invention, the cup 27 may be drawn from its central supporting position to a position outside of the central viewing area, in the manner above described and as indicated, for example, in the second diagram of Fig. 7. As a still further novel practice of this invention, the cup 27 may be located beneath the dehydration hole 15 and at this time be filled through said hole with a suitable desiccant 29, as indicated by the third diagram of Fig. 7, such as $P_2O_5$ or a mixture of three parts $P_2O_5$ and one part $CaSO_4$. Alternatively, a desiccant may be placed in the cup 27 prior to its being disposed in the central supporting position between the sheets 11 and 12. That is, the cup may be prepared for dehydrating either before or after edge sealing of the sheets. In either case, however, the cup 27 would be moved to a position outside of the central viewing area subsequent to said edge sealing.

The cup 27 may be formed of cylindrical side walls 30, a bottom wall 31 and open at the top. Small openings 32 are formed in the side walls of the cup to permit the desiccant therein to effectively dehydrate the air space 14 within the unit. It will further be understood that the diameter of the cup 27 need not necessarily be smaller than that of the dehydration hole 15 inasmuch as said cup is not removed from within the air space 14. In fact, due to the relatively small size of the dehydration hole and the correspondingly large size of the cup for containing the desiccant 29, the cup 27 is usually larger than said hole.

Finally, according to this latter-described form of the present invention, the dehydration hole 15 may be sealed by a plug 16 in any conventional manner to form a glazing unit 10 of the type shown in section in Fig. 3. It will be appreciated, however, that this novel method not only provides an excellent means for centrally supporting the upper sheet 11 during the edge sealing operation, but also eliminates the necessity of a separate and additional dehydrating measure, as mentioned in connection with the first-described form of this invention. That is, the cup 27 performs a dual function as the central supporting means and also as a container or reservoir for the dehydrating means within the completed unit.

The solder, mastic, or other suitable material forming the plug 16 may be disposed within the hole 15 so as to cause a small portion thereof to extend into the air space 14, as indicated in Fig. 3. In this manner, the cup 27 is maintained in its position beneath said hole and outside of the central viewing area through the unit. Also, of course, the cup 27, after having been filled with the desiccant, will be maintained in its position beneath the dehydration hole 15 due to its relatively tight frictional fit between the glass sheets as well as the added weight of the desiccant. In any case, however, the unit 10 may be mounted with the cup 27 and hole 15 in the lowermost position, thus further insuring its maintenance outside the central viewing area.

As previously mentioned, it may be found necessary to use two or more supporting means. In the case of the form of this invention described particularly with respect to Fig. 6, this would present no substantial difficulties as the rods 26 could be individually and successively disposed beneath and drawn from the single dehydration hole. Similarly, the cups 27 could be individually and successively filled through dehydration hole 15. If desired, however, one or more holes may be formed in the upper sheet 11 for for this purpose.

Although the novel method of this invention has been particularly described in connection with the production of all-glass, multiple sheet glazing units, it is contemplated that it may also be practiced in the formation of other conventional types of double glazings. For example, this invention may be practiced in the formation of double glazings in which the glass sheets are supported in spaced relation along their edges by separator strips of a substantially impervious material. In such a case, the central supporting means above-described would be employed between central portions of the sheets as the marginal portions thereof were supported by and sealed to their respective separator strips.

It is to be understood that the forms of the present invention are to be taken as illustrative embodiments only, and that various changes in the shape, size and arrangement of parts, as well as various procedural changes, may be resorted to without departing from the spirit of the invention or the scope of the subjoined claims.

We claim:

1. In a method of producing multiple sheet glazing units, the steps of assembling one sheet of glass in spaced face-to-face relation above another sheet, placing supporting means between central portions of said sheets inwardly of the edges thereof to maintain said central portions in fixed spaced relation, sealing the edges of said sheets together entirely therearound to enclose an air space therebetween while maintaining the central portions of said sheets in said fixed spaced relation, and removing said supporting means from said central portions of the glass sheets to a position within said air space outside of the central viewing area of the sheets.

2. In a method of producing multiple sheet glazing units, the steps of assembling a pair of glass sheets in spaced and horizontally disposed face-to-face relation, supporting the upper sheet in fixed spaced relation above the lower sheet by spacing means disposed inwardly of the edges of said sheets and within the central viewing area thereof, sealing the edges of said sheets together entirely therearound to enclose an air space therebetween while maintaining the upper sheet in said fixed spaced relation above the lower, and removing said spacing means from said central viewing area of said sheets subsequent to the edge sealing thereof.

3. In a method of producing multiple sheet glazing units, the steps of supporting the edges and central portion of one sheet of glass in fixed spaced and horizontally disposed face-to-face relation above those of another sheet, sealing the edges of the upper sheet to those of the lower sheet entirely therearound while maintaining the support for the central portion of said upper sheet, and removing said latter-mentioned support subsequent to the edge sealing of said sheets.

4. In a method of producing multiple sheet glazing units, the steps of assembling a pair of glass sheets in spaced and horizontally disposed face-to-face relation, sealing the edges of said sheets together entirely therearound while maintaining the central portions of said sheets in fixed spaced relation with spacing means disposed therebetween, and removing said spacing means from the viewing area of the central portions of said sheets subsequent to the edge sealing thereof.

5. In a method of producing multiple sheet glazing units, the steps of assembling one sheet of glass having a hole therein toward an edge thereof in spaced and horizontally disposed face-to-face relation above another sheet, maintaining the central portion of the upper sheet in fixed spaced relation above that of the lower sheet by supporting means disposed between the central portions of said sheets and inwardly of the central viewing area thereof, sealing the edge portions of said sheets together entirely therearound to enclose an air space therebetween while maintaining the central portions thereof in said fixed relation, and removing said supporting means from between the central portions of said sheets and inwardly of the central viewing area thereof to a position outside of said central viewing area.

6. In a method of the character defined in claim 5, the additional step of disposing said supporting means within the air space enclosed between said sheets beneath said hole in the upper sheet.

7. In a method of the character described in claim 6, the additional step of removing the supporting means from within said air space through said hole.

8. In a method of the character described in claim 6, the additional step of sealing said hole in the upper sheet.

9. In a method of the character described in claim 6, the additional steps of removing the supporting means from within the air space through the hole and subsequently sealing said hole.

10. In a method of the character described in claim 6, the additional steps of removing the supporting means from within the air space through the hole, dehydrating the atmosphere in said air space, and sealing said hole.

11. In a method of the character described in claim 6, the additional step of placing a desiccant material in said spacing means beneath said hole.

12. In a method of the character described in claim 11, the additional step of sealing said hole subsequent to the placing of a desiccant in said spacing means.

References Cited in the file of this patent

UNITED STATES PATENTS

| Number | Name | Date |
| --- | --- | --- |
| 1,124,778 | Meuler | Jan. 12, 1915 |
| 1,370,974 | Kirlin | Mar. 8, 1921 |
| 1,448,351 | Kirlin | Mar. 13, 1923 |
| 2,389,360 | Guyer et al. | Nov. 20, 1945 |